United States Patent [19]

Detert et al.

[11] Patent Number: 4,832,791
[45] Date of Patent: May 23, 1989

[54] MULTIPURPOSE SHEET MATERIAL AND METHOD OF MANUFACTURE

[75] Inventors: Ernst-Rolf Detert; Wilhelm H. Buchholz; Klaus Gerlach-Meinders, all of Lubbecke, Fed. Rep. of Germany

[73] Assignee: Eduard Gerlach GmbH, Lubbecke, Fed. Rep. of Germany

[21] Appl. No.: 819,221

[22] Filed: Jul. 26, 1977

[30] Foreign Application Priority Data

Jul. 27, 1976 [DE] Fed. Rep. of Germany ....... 2633659

[51] Int. Cl.$^4$ .............................................. D21H 5/12
[52] U.S. Cl. ..................................... 162/99; 162/148; 162/150; 162/158; 162/168.1; 162/175; 162/176; 162/177; 162/178; 162/181.1
[58] Field of Search ................... 162/91, 99, 148, 150, 162/178.2, 168.1, 175, 176, 177, 178, 181.1; 426/615, 517

[56] References Cited

U.S. PATENT DOCUMENTS

| | | | |
|---|---|---|---|
| 18,389 | 10/1857 | Collyer | 162/99 |
| 1,389,936 | 9/1921 | Clapp | 162/148 |
| 1,862,688 | 6/1932 | Loetscher | 162/225 |
| 1,908,489 | 5/1933 | Sartakoff | 426/615 |
| 1,986,291 | 1/1935 | Schur | 162/158 |
| 1,992,996 | 3/1935 | Dodge | 162/158 |
| 2,030,625 | 2/1936 | Ellis | 162/225 |
| 2,046,750 | 7/1936 | Mason et al. | 162/225 |
| 2,285,490 | 6/1942 | Broderick | 162/158 |

FOREIGN PATENT DOCUMENTS 517302  3/1921  France .................................. 162/99
2442  of 1856  United Kingdom .................. 162/99

OTHER PUBLICATIONS

Casey "Pulp & Paper", vol. II (1960), p. 1179.

*Primary Examiner*—Peter Chin
*Attorney, Agent, or Firm*—Lockwood, Alex, FitzGibbon & Cummings

[57] ABSTRACT

A sheet material is produced by pressing to sheet form in the presence of water a material derived from a plant of the type *Beta Vulgaris* (sugarbeet and beetroot). Fresh plant material can be used as well as plant material already used for sugar production. The plant material preferably has a particle size of 0.1 to 10 mm. The sheet material may be water soluble or water insoluble the latter condition being achieved by mixing with the plant material a dialdehyde, such as glyoxal, dialdehyde starch or other bivalent substance capable of reacting with hydroxyl groups or by heat treatment or a combination of both. The degree of water solubility of the sheet material can be controlled in this way. The sheet material can be expanded by thermal shock treatment. The sheet material may be used as a smokey generating agent by incorporating wood dust with the plant material, as a fertilizer by incorporating fertilizing salts with the plant material, as a tobacco extender by incorporating tobacco with plant material and as fish or animal fodder by incorporating food products with the plant material. The sheet material also has other applications such as in the building and paper industry.

30 Claims, No Drawings

MULTIPURPOSE SHEET MATERIAL AND METHOD OF MANUFACTURE

BACKGROUND OF THE INVENTION

This invention relates to a novel multipurpose material sheet and the method of manufacture.

It is known that material in sheet form may be made from the most varied substances. For example, plates may be rolled from iron or steel, paper sheet can be made from a slurry of cellulose fibres, plastics sheets can be made from a polymerisable organic substance, and similar substances of this kind exist in relatively large numbers. These sheets of material, however, have very limited properties and applications, and they differ from one another basically in that, either a binding agent must be added in order to bond the individual particles together, for example in the manufacture of paper sheets, or the particles themselves bond together by means of internal molecular or atomic forces, as for example in plastics sheet or steel sheet. Finally, they can only be used as such and it is not possible to apply them also for other purposes, because the special physical or chemical nature of their material stands in the way of multipurpose application.

BRIEF SUMMARY OF INVENTION

It is an object of the present invention to produce a multipurpose sheet material, which can be simply varied in a controlled manner in regard to its properties, which can be changed or filled with other substances and compounds, which can be employed in the most varied fields of use for example as fodder in agriculture, as fertilizer, foodstuffs and semi-luxury products, as building material and for the paper industry, and which, in spite of this very varied range of applications and uses, can be made in a simple manner from simple and cheap materials.

The invention provides a method of manufacturing a multipurpose sheet material which comprises the step of pressing to sheet form in the presence of water material derived from a plant of the type Beta Vulgaris. Beet slices of plants of the type Beta Vulgaris (sugarbeet and beetroot) are disintegrated, where dried slices are used with the addition of water, and the mass is pressed to form a material sheet.

Dried slices are predominantly the extracted slices produced in beet sugar production, which are made suitable for storing by drying.

Wet or moist slices are the beet slices occurring as waste material in the beet sugar industry immediately after recovery of the sugar or the slices specially prepared for this process from fresh or stored beet, which are brought to the desired moisture content by pressing.

In this manner, a completely homogenous, cohesive, translucent, parchment-like material sheet possessing high mechanical strength and controllable water resistance is obtained.

This inventive result is completely surprising and could not have been foreseen, because no similar, comparable prototype or product exists.

It has been demonstrated that the thus produced material sheet possesses high absorption capability or binding force for foreign substances or fillers of all types. The starting material is a thickened root of a plant of fairly high order, for which such properties could not be expected. The starting material used is either drained slices of fresh or stored Beta Vulgaris, that is sugarbeet, or the dried slices occurring as waste material from beet sugar production. Slices of beetroot can also be used.

It is indeed known that vegetable substances of some lower plants, for example the thallophytes, or the seed of higher plants contain binding agent, for example the fruits or seeds of carob bean plants, which can be processed to a sheet or strip. It is also known that certain exudates from damaged stems of trees and bushes, for example gum arabic, tragacanth etc., can be processed to form sheets or utilised as binding agent, but it could not possibly have been foreseen that Beta Vulgaris roots can be processed in this way and moreover could provide a considerable number of additional advantages.

In making such a sheet material according to this invention, the start may be made, as already mentioned, from freshly harvested or stored Beta Vulgaris roots, which have been washed and granulated, or from the dried slices, which occur in large quantities in the sugar industry, and which hitherto have only been used as fodder.

The invention also extends to sheet material which comprises material derived from a plant of the type Beta Vulgaris (e.g. sugarbeet and beetroot) with or without the addition of compounds to control the water solubility of the product and with or without the addition of materials relevant to the intended use of the product, which plant material is pressed to sheet form in the presence of water.

DETAILED DESCRIPTION OF INVENTION

To make a material sheet from freshly harvested or stored Beta Vulgaris roots, the procedure is as follows: The freshly harvested or stored beets have their tops removed, are washed and disintegrated, preferably to a particle size of 0.1 to 10 mm. The mash is then pressed to a moisture content of about 20% by weight using appropriate equipment. This results in a mass which can be rolled out under pressure, for example in a 3-roller mill, in one operation to give an easily strippable material sheet. Contrary to all previous experience with other materials, it is already so stable, while still in the moist state, that it can be fed without supporting devices or conveyor belts to a moving belt, which then carries the moist sheet to a suitable drying device, where the desired moisture content is produced. After this, it is wound onto a reel or disintegrated into greater or lesser particles.

The material sheet prepared in accordance with the foregoing is very easily water-soluble, of uniform appearance and transparent. After fairly long storage of the moist raw material before pressing, for example by rolling out in a rolling mill, the colour deepens to a dark brown.

Instead of the fresh or stored beet in its natural state, dried beet slices, which occur in large quantities in the beet sugar industry, can also be used as starting material for making the sheet material. The slices, almost completely cleared of all water-soluble constituents, which hitherto have only been used as fodder, are brought to a suitable particle size of 0.1 to 10 mm, are stirred with a small quantity of water and, after a swelling time of about half an hour, are kneaded to a homogenous mass, which after passing through the roller mill produces a material sheet which hardly differs at all from that prepared from fresh beet. In this case also, the colour can be varied by storing the wet raw material. Freshly pressed residues from beet can be mixed with granulated, dried beet slices in any proportion. As a result of this measure, it becomes possible to adjust the water content of the freshly pressed residue to an optimum value for the rolling out of the sheet in the roller mill. It has been found that an addition of light volatile solvents, such as methanol as an example of a water-soluble solvent on the one hand, and methylene chloride as an example of a water-insoluble solvent on the other hand, is highly favourable to the production of a fault-free, smooth material sheet in the roller mill.

The quantity of water to be added will depend upon the water content and the particle size of the beet slices and will be so selected that the slices have a water content of 30 to 65% by weight before pressing.

The above-mentioned solvents may with advantage be incorporated in proportions of 25 to 50% by weight of the entire solvent mass in the homogeneous, kneaded phase of pressed beet residue and/or ground dry slices to which water has been added. Methylene chloride and other volatile halogenated hydrocarbons also have the property of conserving the sheet basic material and of protecting it from decomposition by bacteria when stored for long periods. The halogen compounds largely volatilise while the material is still being rolled in the 3-roller mill. After the sheet material has been dried to about 20% humidity, these compounds can scarcely any longer be detected.

The elasticity of the sheet material is adjusted by its moisture content and optionally also by the addition of suitable plasticizers in a proportion of up to 20% by weight. Suitable materials for this purpose are sugar alcohols, monoglycols and polyglycols, multivalent alcohols such as glycerine, sugar syrup and hygroscopic salts such as potassium lactate.

The water-solubility of the sheet material, which is suitable for many purposes, can be regulated by various measures towards the water-insoluble condition. An addition of dialdehydes, such as glyoxal, dialdehyde starch and other bivalent substances reacting with hydroxyl groups in a proportion of up to 10% by weight renders the sheet more waterproof without special heat treatment. The water resistance can, however, also be increased by the action of heat. The reactivity of the mass of Beta Vulgaris is noticeably better than with the conventional binding agents. Salts of the elements of Group II in a proportion of up to 10%, especially magnesium and calcium salts, added in dissolved form to the mass, likewise increase the waterproofness of the sheet.

A quite surprising fact observed is that the intrinsically water-soluble sheet material becomes water-insoluble by heat treatment about 100° C. without the presence of cross-linking agents or without the aforementioned salts. If the heat supplied from outside is concentrated into a very short period, in other words if the sheet is subjected to a thermal shock by suitable equipment, then a further surprising phenomenon results, that the sheet material is expanded or blown in a manner which previously could only be obtained in some special sheets with a very expensive, internally acting high frequency energy in the presence of light volatile solvents and special binding agents. It is quite unusual that, in spite of the loose structure resulting from the expansion, the sheet material is absolutely water-insoluble.

The mass of pressed residues or dried slices of beet can be mixed in any desired quantity with other water-soluble film-forming agents. Thus, polyvinyl pyrrolidone, methyl cellulose, carboxy methyl cellulose, guar powder, gum arabic, and other swelling agents from the synthetic, semi-synthetic or natural ranges may be incorporated. Water-insoluble film formers are preferably added in the form of aqueous emulsions. In this way it is possible, for example, for polyvinyl acetate dispersions to combine with the sheet material mass. The mechanical properties of the sheet material can be suitably adapted to the requirements by the aforementioned or similar film formers.

The sheet mass described above, with or without additional film formers, is very absorbent for organic and inorganic fillers. A surprising fact is that up to 60% of water-soluble, possibly hygroscopic salts can be incorporated into the mass from beet residues without substantially detracting from the binding force.

The sheets produced by the methods indicated can be used in many fields, for example as supports for fodder and fertilizer preparations, for foodstuffs and semiluxuries, as building materials and for the paper industry.

On account of the described possibility of adjusting the colour, it is possible to make, from pressed residues of beet without further additives, sheets which do not differ in appearance from tobacco sheet and which produce a mild smoke when carbonised.

In the ranges adjacent to the incandescent zone, the above-described expansion effect also occurs. Sheets expanded by thermal action possess better combustion properties and yield less condensate when carbonised. Beet pressed residues are therefore suitable for the production of tobacco-free and tobacco-containing smoking products, which may contain more than 75% by weight of tobacco.

The invention will now be explained in more detail with reference to examples thereof:

EXAMPLE I 100 kg dried and ground beet slices
60 kg water

The beet slices having a particle size between 100 and 150 $\mu$ are thoroughly mixed with the water for five minutes in a paddle mixer. This is followed by a swelling period of twenty minutes. Thereupon, the mixed material is introduced into the entry gap of a 3-roller mill and after passing through is pulled as a satisfactory material sheet by the delivery roll and conducted for drying and moisture-adjustment through a drying furnace. The sheet material had a weight of 80 g/m².

This sheet is water-soluble, and can be used as a support for fertilizers, fodder, plant seeds etc. Under the action of water, the sheet dissolves very rapidly.

EXAMPLE II

The mass of Example I after passing through the roller mill, is conducted through a heat radiation field, so that it is thoroughly dried and attains a temperature of 110° C. The sheet is then brought to a moisture content of 20% by weight and rolled up. It is almost water-resistant. The weight is as Example I.

EXAMPLE III

The mass according to Example I, after passing through the roller mill, is heated in a short time to about 400° C. The cross-section of the sheet thus adopts a blown or expanded structure. It is then brought to a moisture content of 20% and reeled up. It is absolutely water-resistant.

EXAMPLE IV 100 kg of beet slices, particle size: >0.2 mm.
40 kg beech husk dust, particle size up to 0.4 mm
60 kg oak sawdust, particle size up to 0.4 mm
90 kg water
15 kg potassium lactate 50% in water
15 kg methanol The dry components, consisting of ground beet slices, beech husk powder and oak sawdust are introduced into a turbulence mixer with simultaneously revolving mixing heads and mixed dry for five minutes. The liquid components, consisting of water, potassium lactate and methanol, are added and mixing is again carried out for five minutes.

After a maturing time of 20 minutes, the mass is introduced into the inlet gap of a three-roller mill. After passing through the three-roller mill, a stable sheet is pulled from the delivery roll which, after drying, has a weight of about 180 g/m² and is cut into flakes.

These flakes are suitable as a smoking agent for meat products. The dimensions of the flakes were 50×50 mm.

EXAMPLE V 100 kg beet slices, dried and ground, particle size up to 150μ
100 kg fertilizer salts mixture, consisting of potassium nitrate, potassium phosphate, ammonium phosphate and urea
10 kg methylene chloride
20 kg methanol
25 kg water
5 kg diethylene glycol The dry components, consisting of ground beet slices and fertilizer salts mixture, are mixed for five minutes in a turbulence mixer. The liquid mixture is then added and mixing continued for a further five minutes.

After a maturing time of 20 minutes, the mass is rolled to a sheet by means of three-roller mill and conducted through a drying duct, where the volatile solvents are removed.

This sheet can be used as a fertilizer, for example by unrolling it on the ground or sprinkling it in the form of flakes. When subjected to the action of water (rain), it dissolves very rapidly. In this way, an exact, controllable, dust-free and ballast-free fertilizer is obtained.

EXAMPLE VI 90 kg beet slices, dried and ground, particle size up to 125μ
10 kg tobacco, particle size up to 125μ
60 kg water
2 kg potassium nitrate
2 kg potassium lactate (50% aqueous solution)
4 kg diethylene glycol
4 kg methanol
1 kg aroma dressing The dry components are mixed as in Example I.

The liquid components are then added together with the dissolved potassium nitrate. After a mixing time of five minutes and maturing time of 20 minutes, the mass is drawn to a sheet on a three-roller mill and further processed in accordance with Example II.

This sheet is a tobacco-containing tobacco substitute.

EXAMPLE VII 100 kg beet slices, dried and ground, particle size up to 125μ
10 kg soya flour
10 kg meat powder
5 kg fish meal
2 kg dried blood
3 kg vitamin preparation
20 kg rusk powder
10 kg methylene chloride
10 kg methanol
5 kg groundnut oil
60 kg water
15 kg sorbite (50% aqueous solution)

The dry components are mixed as in Example I. The liquid components are then added. After a mixing time of five minutes and maturing time of 20 minutes, the mass is rolled to a sheet on a three-roller mill, is dried and broken up into small flakes or conditioned and wound onto reels. In this manner a fodder or fodder additive is obtained for feeding fish and small animals.

What is claimed is:

1. A method of manufacturing a multipurpose sheet material which comprises the step of pressing, to sheet form, plant material in moist, particulate form, said plant material being substantially untreated and selected solely from the group consisting of fresh Beta Vulgaris, previously dried Beta Vulgaris, Beta Vulgaris produced from beet sugar production and mixtures thereof, and drying said sheet form.

2. A method according to claim 1 in which the plant material is derived from at least partially dried pieces of said plant material reduced to particulate size and with added water to moisten said material.

3. A method according to claim 1 in which said plant material is derived from fresh pieces of said plant reduced to particulate size and having a natural water content.

4. A method according to claim 1 in which the plant material is derived from pieces of said plant reduced to a size in the range of from 0.1 to 10 mm.

5. A method according to claim 1 which includes the step of adjusting the moisture content of the plant material to a value between about 25 to 50% by weight before pressing to sheet form.

6. A method according to claim 5 in which up to two-thirds by weight of said moisture content is replaced by an organic light volatile solvent.

7. A method according to claim 6 in which at least a part of said organic light volatile solvent is methanol.

8. A method according to claim 6 in which at least a part of said organic light volatile solvent is methylene chloride.

9. A method according to claim 1 in which the waterproof property of the pressed sheet plant material is enhanced by adding to the material before pressing to sheet form a bivalent substance capable of reacting with hydroxyl groups of said plant material.

10. A method according to claim 1 in which the waterproof property of the pressed sheet material is enhanced by adding to the material before pressing to sheet form a dialdehyde.

11. A method according to claim 10 in which the dialdehyde is glyoxal.

12. A method according to claim 10 in which the dialdehyde is a dialdehyde starch.

13. A method according to claim 1 in which the plant material is mixed with water to moisten said material and allowed to mature for a period of time before being pressed to sheet form.

14. A method according to claim 1 in which the plant material is stored for a period of time to deepen its colour before being processed.

15. A method according to claim 1 in which the plant material is mixed with an inorganic filler before pressing to sheet form.

16. A method according to claim 1 in which the plant material is mixed with an organic filler other than said plant material.

17. A method according to claim 15 in which the filler comprises a hygroscopic salt.

18. A method according to claim 1 in which the plant material is mixed with a filler which comprises material derived from plants other than said plant material.

19. A method according to claim 1 in which the plant material is mixed with a water-soluble film forming compound.

20. A method according to claim 19 in which the film forming compound is a compound selected from the group consisting of polyvinyl pyrrolidone, methyl cellulose, carboxy methyl cellulose, guar powder, gum arabic and synthetic, semi-synthetic and natural swelling agents.

21. A method according to claim 19 in which the film forming compound is in the form of an aqueous emulsion.

22. A method according to claim 1 in which the material pressed to sheet form is exposed to an elevated temperature of the order of 400° C. for a brief period of time.

23. A method according to claim 1 in which the plant material before pressing to sheet form is mixed with a plasticiser.

24. A method according to claim 23, in which the plastisiser is selected from the group consisting of sugar alcohols, monoglycols and polyglycols.

25. A method according to claim 1 in which the plant material before pressing to sheet form is mixed with a multivalent alcohol as a plasticizer.

26. A method according to claim 25 in which the multivalent alcohol is selected from the group consisting of glycerine and sugar syrup.

27. A method according to claim 1 in which the plant material before pressing into sheet form is mixed with a hygroscopic salt as a plasticizer.

28. A method according to claim 27 in which the hygroscopic salt is potassium lactate.

29. A method according to claim 1 in which the plant material is passed through a roller mill to form said sheet material.

30. A method of making sheet material which comprises mixing plant material in moist particulate form, said plant material being substantially untreated and selected solely from the group consisting of fresh Beta Vulgaris, previously dried Beta Vulgaris, Beta Vulgaris produced from beet sugar production and mixtures thereof, said untreated plant material having a particle size in the range of 0.1 to 10 mm, with water, at least one of a light volatile solvent, a bivalent substance that reacts with hydroxyl groups, a filler compound from the group consisting essentially of an inorganic filler and organic fillers other than said plant material, a water-soluble film forming compound, a plasticizer, a multivalent alcohol and a hygroscopic salt, adjusting the water content of the mixture to between about 25 to 50% by weight, rolling the mixture to sheet form, and drying said sheet form.

* * * * *

UNITED STATES PATENT AND TRADEMARK OFFICE
CERTIFICATE OF CORRECTION

PATENT NO. : 4,832,791

DATED : May 23, 1989

INVENTOR(S) : Ernst-Rolf Detert; Wilhelm H. Buchholz; Klaus Gerlach-Meinders It is certified that error appears in the above-identified patent and that said Letters Patent is hereby corrected as shown below:

In col. 1, line 32, delete "changed" and insert --charged--.

Signed and Sealed this

Sixteenth Day of January, 1990

*Attest:*

JEFFREY M. SAMUELS

*Attesting Officer*   *Acting Commissioner of Patents and Trademarks*